April 1, 1930.  B. V. STOLL  1,752,709
GASOLINE FILTERING SYSTEM AND APPARATUS
Filed March 14, 1929
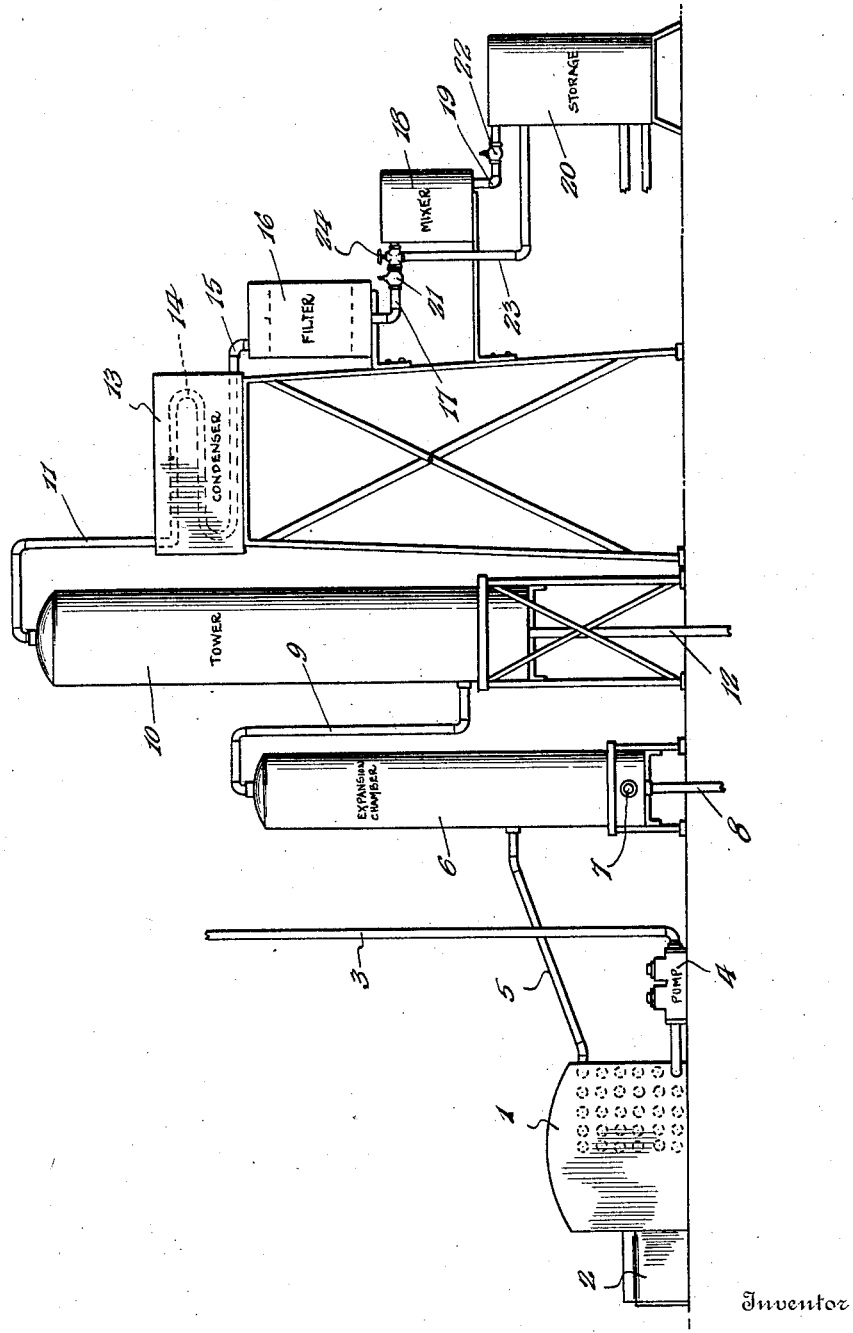
Inventor
Berry V. Stoll.
By Lacey & Lacey,
Attorneys Patented Apr. 1, 1930

1,752,709

UNITED STATES PATENT OFFICE

BERRY VINCENT STOLL, OF LOUISVILLE, KENTUCKY, ASSIGNOR TO STOLL OIL REFINING COMPANY, OF LOUISVILLE, KENTUCKY, A CORPORATION OF KENTUCKY

GASOLINE-FILTERING SYSTEM AND APPARATUS

Application filed March 14, 1929. Serial No. 347,059.

This invention relates to a system and apparatus for filtering gasoline and more particularly to a system by means of which gasoline passing from a condenser may be purified before delivering to a storage tank.

When gasoline first passes from a condenser, it is sweet and colorless but it has been found that if it is allowed to stand for a short length of time after passing from a condenser it gradually turns yellow or otherwise discolored and also becomes sour. In fact, it has been found that the gasoline will begin to change color within a few hours after passing from a condenser and within a day or so will become a pronounced yellow and so rancid that it will have a very disagreeable odor. This objectionable feature has been partially overcome by treating the gasoline with acid and by coloring it with dye before delivering into a storage tank but such treatment has not been found entirely satisfactory as gasoline which has been treated with acid is reduced in quality.

Therefore, one object of the invention is to provide a method by means of which the gasoline from a condenser may be purified before delivering to a storage tank and thus eliminate the necessity of using acid to prevent the gasoline from going off color.

It has also been previously proposed to purify gasoline by passing the fumes through a filter before the fumes reach the condenser and while this treatment prevents gasoline from going off color after being delivered from the condenser it has been found objectionable as the fumes are hot when passed through the filter and it is well known that the best results are obtained if gasoline is filtered when cold.

Therefore, I propose to attach a filter to the outlet pipe of a condenser and allow the gasoline to pass directly from the condenser into the filter without being exposed to the atmosphere so that the gasoline may be filtered while cold and immediately after condensation, thereby producing a finished product which will remain sweet indefinitely and not go off color.

Another object of the invention is to allow the gasoline to be passed through a filter while under pressure and thus facilitate the filtering operation.

Another object is to allow the filtered gasoline to be treated with an alkali, such as caustic, while passing from the filter to the storage reservoir if it is found that the gasoline contains an excessive amount of sulphur and to cause the gasoline to be held under pressure while passing through the alkali mixer.

An apparatus for carrying out the improved method of treating gasoline is illustrated in the accompanying drawing wherein is disclosed a diagram of the apparatus.

Referring to the accompanying drawing, the numeral 1 indicates a pipe still of a conventional construction and the numeral 2 designates a furnace by means of which the still is heated. The pipe 3 through which oil is delivered to the still leads from a suitable source of supply and in the length of this pipe is provided a pump 4 for applying pressure. A pipe 5 leads from the still 1 to an expansion chamber 6 of a conventional construction having a clean-out opening 7 and a drain pipe 8 and from the top of the expansion chamber extends a pipe 9 leading to a fractionating tower 10 from the upper and lower ends of which extend pipes 11 and 12. The pipe 11 leads to a condenser 13 where it is coiled, as shown at 14, so that fumes passing through this pipe will be condensed to form gasoline. The discharge end 15 of the pipe 11 projects from one side of the condenser and this discharge end of the pipe extends directly into a filter 16 mounted close to the condenser. The filter is of a conventional construction and is preferably charged with fuller's earth through which the gasoline is passed and from the lower end or bottom of the filter extends an outlet pipe 17 which leads to a mixer 18 in which the gasoline may be treated with an alkali, such as caustic. This mixer is also provided with an outlet pipe 19 leading to a storage tank 20 and in the pipes 17 and 19 are provided pressure release valves 21 and 22 which hold the gasoline under pressure supplied by the pump 4. These valves are conventional release valves and the valve 21 should be set to release at a higher pressure than the valve 22. Therefore the gasoline will be filtered while under a relatively high pressure and a very efficient filtering operation will take place. By this arrangement the gasoline will be immediately filtered as it passes from the condenser and then passed through the mixing tank 18 to the storage tank 20 without being exposed to the atmosphere and in addition the gasoline will be filtered while cold. It has been found that gasoline so treated will not go off color and will remain sweet for an indefinite period. If gasoline having a low percentage of sulphur is being treated, it is not necessary to use caustic or an equivalent alkali, although the gasoline will not be damaged by such treatment, and in order to allow this grade of gasoline to reach the storage tank without passing through the mixer, I have provided a branch pipe 23 controlled by a valve 24 which, when properly adjusted, will allow the gasoline to pass through the pipe 23 into the storage tank instead of through the mixer 18 and pipe 19.

By actual tests it has been found that gasoline treated in accordance with my improved method will have high power and anti-knock qualities and will remain clear and sweet for an indefinite period of time without being subjected to acid treatment. I have, therefore, produced a very efficient method of purifying gasoline and obtaining a finished product which will remain sweet and not go off color.

Having thus described the invention, I claim:

1. Apparatus for producing finished gasoline comprising refining means including a still and a condenser connected thereto and having a discharge pipe, a filter having its inlet connected with the discharge pipe of said condenser whereby the gasoline will be delivered directly from the condenser to the filter, an outlet pipe leading from said filter, a mixer having the outlet pipe of said filter connected thereto, an outlet pipe for said mixer, and a storage reservoir having the outlet pipe of the mixer connected thereto.

2. Apparatus for producing finished gasoline comprising refining means including a still and a condenser connected thereto and having a discharge pipe, a filter having its inlet connected with the discharge pipe of said condenser whereby the gasoline will be delivered directly from the condenser to the filter, an outlet pipe leading from said filter, a mixer having the outlet pipe of said filter connected thereto, an outlet pipe for said mixer, a storage receptacle having the outlet pipe of the mixer connected thereto, a pressure release valve in the pipe between the filter and mixer, and a release valve in the outlet pipe of the mixer discharging at a lower pressure than the valve between the filter and mixer.

3. Apparatus for producing finished gasoline comprising a still, an expansion chamber, a pipe leading from said still to said chamber, a tower, a pipe leading from said chamber to the lower portion of said tower, a condenser having a feed pipe connected with said tower and a discharge pipe, a filter containing adsorbent clay connected with the discharge pipe of said condenser, an alkali mixer, a discharge pipe for said filter leading to said mixer, a storage receptacle, a discharge pipe leading from said mixer to said storage receptacle, and pressure release valves in the discharge pipes of the filter and mixer serving to hold back pressure on the entire apparatus and cause gasoline to be filtered and treated simultaneously with condensing while under pressure.

4. The method of producing finished gasoline which consists of condensing gasoline vapors resulting from a cracking process and immediately filtering the gasoline through a decolorizing adsorbent, directly treating the filtered gasoline with an alkali, and delivering the gasoline after the alkali treatment directly to a storage reservoir all in the absence of air.

In testimony whereof I affix my signature.

BERRY VINCENT STOLL. [L. S.]